US008792681B2

(12) United States Patent
Sugai

(10) Patent No.: US 8,792,681 B2
(45) Date of Patent: Jul. 29, 2014

(54) IMAGING SYSTEM AND IMAGING METHOD

(71) Applicant: Canon Kabushiki Kaisha, Tokyo (JP)

(72) Inventor: Takashi Sugai, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/842,814

(22) Filed: Mar. 15, 2013

(65) Prior Publication Data

US 2013/0216099 A1      Aug. 22, 2013

Related U.S. Application Data

(62) Division of application No. 12/623,241, filed on Nov. 20, 2009, now Pat. No. 8,437,504.

(30) Foreign Application Priority Data

Nov. 25, 2008   (JP) .................................. 2008-299785

(51) Int. Cl.
G06K 9/00       (2006.01)
(52) U.S. Cl.
USPC ....................................................... 382/103
(58) Field of Classification Search
CPC ............ G06K 9/00771; G06K 9/3216; G06K 9/3241; G06T 7/0081
USPC ....................................................... 382/103
See application file for complete search history.

(56) References Cited

U.S. PATENT DOCUMENTS

| H1812 H | 11/1999 | Arcuri |
| 6,041,143 A | 3/2000 | Chui et al. |
| 6,639,202 B2 | 10/2003 | Chen |
| 6,839,452 B1 * | 1/2005 | Yang et al. ..................... 382/103 |
| 7,106,374 B1 * | 9/2006 | Bandera et al. ............... 348/308 |
| 7,719,568 B2 | 5/2010 | Hung et al. |
| 7,728,900 B2 | 6/2010 | Fukushima et al. |
| 8,421,885 B2 * | 4/2013 | Kameyama ................ 348/231.6 |
| 8,437,504 B2 * | 5/2013 | Sugai ............................ 382/103 |
| 2005/0275721 A1 | 12/2005 | Ishii |
| 2006/0274177 A1 | 12/2006 | Masaki et al. |
| 2007/0139529 A1 | 6/2007 | Levien et al. |
| 2007/0188624 A1 | 8/2007 | Zhang |

FOREIGN PATENT DOCUMENTS

| JP | 11-339177 A | 12/1999 |
| JP | 2003-116139 A | 4/2003 |
| JP | 2005-115932 A | 4/2005 |
| JP | 2006-033793 A | 2/2006 |
| JP | 2006-318364 A | 11/2006 |
| JP | 2007-110289 A | 4/2007 |
| JP | 2007-243660 A | 9/2007 |
| JP | 2007-243909 A | 9/2007 |
| JP | 2008-219484 A | 9/2008 |

* cited by examiner

*Primary Examiner* — Tom Y Lu
(74) *Attorney, Agent, or Firm* — Fitzpatrick, Cella, Harper & Scinto

(57) ABSTRACT

An imaging system comprises a whole image read out unit for reading out a whole image in a first resolution from an imaging device, a partial image region selecting unit for selecting a region of a partial image in a part of the whole image which is read out, a partial image read out unit for reading out the partial image in the selected region in a second resolution from the imaging device, a characteristic region setting unit for setting a characteristic region, in which a characteristic object exists, within the partial image, a characteristic region image read out unit for reading out an image of the characteristic region, which is set, in a third resolution from the imaging device, and a resolution setting unit for setting such that the first resolution<the second resolution<the third resolution.

8 Claims, 5 Drawing Sheets

IMAGING SYSTEM AND IMAGING METHOD

This application is a division of Application No. 12/623,241, filed Nov. 20, 2009 (allowed), the contents of which are incorporated by reference herein.

BACKGROUND OF THE INVENTION

1. Field of the Invention

The present invention relates to an imaging system and an imaging method, particularly relates to a monitoring system and a monitoring method, and more particularly relates to a monitoring system and a monitoring method for effectively reducing a data amount of a picked-up image.

2. Description of the Related Art

In recent years, monitoring systems using imaging systems have been disposed in various places and used for detection of intruders.

A monitoring system is required to acquire an image of a wide region and acquire an image of sufficient image quality for specifying a person detected in an imaging region at the same time for the purpose of monitoring the action of the person detected in the imaging region.

Japanese Patent Application Laid-Open No. 2007-243660 proposes a system and a method in which a whole monitoring region is read out in a low resolution, the low-resolution image is analyzed, the characteristic region in the monitoring region is specified from the result, and the region is read out with a high resolution.

Further, Japanese Patent Application Laid-Open No. 2007-110289 suggests a system and a method in which a marked region and an unmarked region are separated in the images in a monitoring region, and the image of only the marked region is acquired in a high resolution.

The invention described in Japanese Patent Application Laid-Open No. 2007-243660 adopts the method in which the inside of an imaging region is photographed in a low resolution, and only when a human figure or the like is detected within the imaging region, the region in which the human figure is detected is photographed in a high resolution. However, when the monitoring range becomes wider, if the image is acquired in a resolution sufficient for detecting a human figure, the data amount becomes enormous, and if the resolution is reduced to suppress the data amount, detection of a human figure itself is highly likely to become difficult. Further, apart from the above described problem, an increase in system load due to useless image data is unavoidable, since information such as a background which does not necessarily need monitoring continues to be acquired.

The invention described in Japanese Patent Application Laid-Open No. 2007-110289 adopts the method in which only a marked region is read out in a high resolution, and the other region is read out in a low resolution. In this method, a marked region is always read out in a high resolution, but in the case of monitoring, even the marked region does not always have to be read out in a high resolution, and only when an object to be monitored is present in the marked region, the marked region has to be read out with a high resolution. Specifically, from the viewpoint of the system load, this method is inefficient.

From the above, in the conventional monitoring systems and monitoring methods, enhancement in ability of detection of a monitoring object such as a human figure in wide-range monitoring, and suppression of increase in system load caused by processing of an acquired image have not been able to be made compatible. This is not limited to the monitoring systems, and in ordinary digital cameras and the like, the similar problem is likely to exist from the viewpoint of enhancement in speed of processing at the time of imaging an object after capturing the object.

An object of the present invention is to provide an imaging system and method which can make enhancement in ability of detection of a monitoring object such as a human figure in wide-range monitoring, and suppression of increase in system load caused by processing of a picked-up image compatible.

SUMMARY OF THE INVENTION

A imaging system of the present invention is characterized by having a whole image read out unit for reading out a whole image in a first resolution from an imaging device, a partial image region selecting unit for selecting a region of a partial image in a part of the whole image, a partial image read out unit for reading out the partial image in the selected region in a second resolution from the imaging device, a characteristic region setting unit for setting a characteristic region, in which a characteristic object exists, within the partial image, a characteristic region image read out unit for reading out an image of the characteristic region set by the characteristic region setting unit in a third resolution from the imaging device, and a resolution setting unit for setting the first to third resolutions such that the first resolution is smaller than the second resolution, and that the second resolution is smaller than the third resolution.

Further, a imaging method of the present invention is characterized by having a whole image read out step for reading out a whole image in a first resolution, a partial image region selecting step for selecting a region of a partial image in a part of the whole image read out, a partial image read out step for reading out the partial image in the selected region in a second resolution, a characteristic region setting step for setting a characteristic region, in which a characteristic object exists, within the partial image, and a characteristic region image read out step for reading out an image of the characteristic region set in a third resolution, and is characterized in that the first to third resolutions are set such that the first resolution is smaller than the second resolution, and that the second resolution is smaller than the third resolution.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

(First Embodiment)

Figure 1:
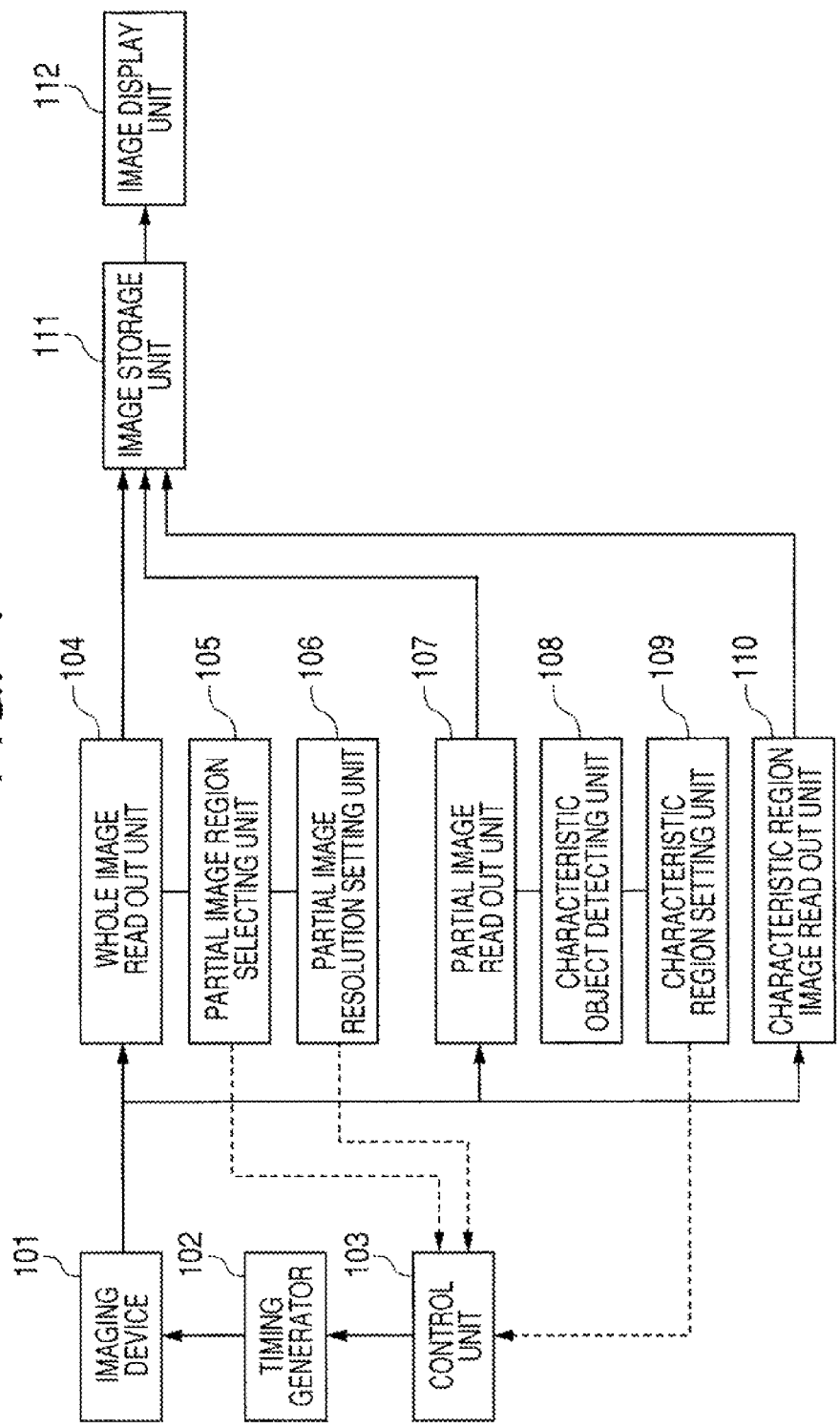
FIG. 1 is a block diagram illustrating one example of a hardware configuration of an imaging system according to a first embodiment of the present invention.

FIG. 1 is a block diagram illustrating one example of a hardware configuration of an imaging system (for example, a monitoring camera) according to a first embodiment of the present invention. An imaging device 101 is a CCD or MOS type sensor or the like which images a monitoring region. A timing generator 102 generates timing signals required for drive and signal processing of the imaging device 101. A control unit 103 controls the operation of the timing generator 102. A whole image read out unit 104 images a whole monitoring region in a low resolution. A partial image region selecting unit 105 selects a partial image region in an optional size as a marked region. A partial image resolution setting unit 106 sets a resolution of the partial image region selected in the partial image region selecting unit 105. A partial image read out unit 107 reads out the partial image region which is selected in the partial image region selecting unit 105 in the intermediate resolution set in the partial image resolution setting unit 106. A characteristic object detecting unit (human figure detecting unit) 108 is for analyzing a partial image, and detecting whether or not an intruder such as a human figure is present within the partial image region. A characteristic region setting unit 109 sets a region as a characteristic region when the presence of an intruder is detected in the region in the characteristic object detecting unit 108. A characteristic region image read out unit 110 reads out the region set in the characteristic region setting unit 109 in a high resolution. An image storage unit 111 is for storing the respective images which are read out. An image display unit 112 is for displaying the stored image data on a display. By using the monitoring system configured as above, the details of its operation will be described below.

Figure 2:
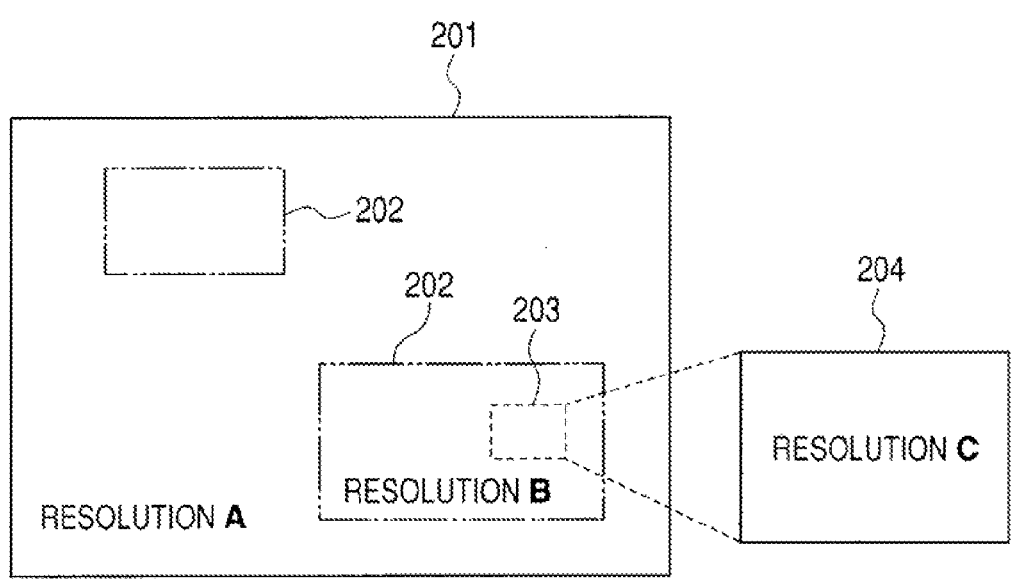
FIG. 2 is a diagram illustrating one example of a monitoring method of the imaging system according to the first embodiment of the present invention.

FIG. 2 is a diagram illustrating one example of a monitoring method of the monitoring system according to the present embodiment. The imaging device 101 outputs a whole image 201 of an imaging region by a drive signal from the timing generator 102. The whole image read out unit 104 reads out the above described whole image 201 in a resolution A from the imaging device 101, and stores the whole image 201 in the image storage unit 111. The image display unit 112 displays the whole image 201 in the image storage unit 111. At this time, the monitoring system only has to display the whole imaging region. More specifically, only the whole monitoring region has to be identified, and information of the details is not required. Therefore, it is more suitable from the viewpoint of the load of data processing that the whole image read out unit 104 reads out the whole image 201 in a low resolution (resolution A) by thinning out the pixels. Further, rapid change does not generally occur to the background of the whole monitoring region, and therefore, the frame rate of the background may be low.

In the region of the whole image 201, a marked region particularly requiring monitoring is selected in the partial image region selecting unit 105, and the details of the partial image 202 is set in the partial image resolution setting unit 106. The partial image region selecting unit 105 selects a marked region in a part of the whole image 201 as the region of the partial image 202. The partial image resolution setting unit 106 sets a resolution B of the region of the partial image 202 selected by the partial image region selecting unit 105. The control unit 103 controls the timing generator 102 so as to read out the region of the partial image 202 selected by the partial image region selecting unit 105 from the imaging device 101 in the resolution B set by the partial image resolution setting unit 106. The timing generator 102 follows the control of the control unit 103, and outputs a timing signal to the imaging device 101. The imaging device 101 receives the timing signal from the timing generator 102, and outputs the partial image 202 in the resolution B. The partial image read out unit 107 reads out the partial image 202 in the resolution B from the imaging device 101, and stores the partial image 202 in the image storage unit 111. The image display unit 112 displays the partial image 202 in the image storage unit 111.

The partial image 202 is for the purpose of detecting a human figure to determine whether or not a human figure is present in the marked region, and therefore, the resolution of the partial image 202 is suitably a higher resolution (resolution B) than the resolution A of the whole image 201. Further, the resolution of the partial image 202 is settable in accordance with necessity. In this case, the resolution B can be such a resolution that allows detection of whether an object is a human figure or not. Further, the number of regions of the partial image 202 does not have to be only one, but a plurality of partial images 202 can be acquired.

The characteristic object detecting unit 108 detects a human figure in the region of the partial image 202 when the human figure is photographed in the region of the partial image 202, in the partial image 202 thus selected. The human figure detecting method in the characteristic object detecting unit 108 will be described. The characteristic object detecting unit 108 performs subtracting process of the partial image 202 with only the background which is acquired in advance and the partial image 202 which is continuously acquired. When a pixel region with a change amount of the image signal exceeding a fixed level is present from the difference of the two partial images 202, the characteristic object detecting unit 108 determines that an intruder occurs in the change pixel region and detects a human figure. When the human figure is detected by the characteristic object detecting unit 108, the characteristic region setting unit 109 sets the region including the above described change pixel region as a characteristic region 203. The characteristic region setting unit 109 outputs the characteristic region 203 and resolution C to the control unit 103. The control unit 103 controls the timing generator 102 so as to read out a characteristic image 204 of the characteristic region 203 in a higher resolution (resolution C) from the imaging device 101 in order to specify and identify the human figure present in the partial image 202. The timing generator 102 follows the control of the control unit 103 and outputs a timing signal to the imaging device 101. The imaging device 101 outputs the characteristic image 204 in the resolution C. The characteristic region image read out unit 110 reads out the characteristic image 204 in the resolution C from the imaging device 101, and stores the characteristic image 204 in the image storage unit 111. The image display unit 112 displays the characteristic image 204 in the image storage unit 111. At this time, the characteristic image 204 is set independently from the partial image 202 so as to include the characteristic object.

The present embodiment is characterized by performing read out control in each of the regions in such resolutions that the resolution A is smaller than the resolution B, and that the resolution B is smaller than the resolution C. Thereby, only a necessary region is read out in a high resolution when necessary, and therefore, the amount of the read out data can be made small. Therefore, the face information of a human figure can be specified without increasing the system load.

(Second Embodiment)

Figure 3:
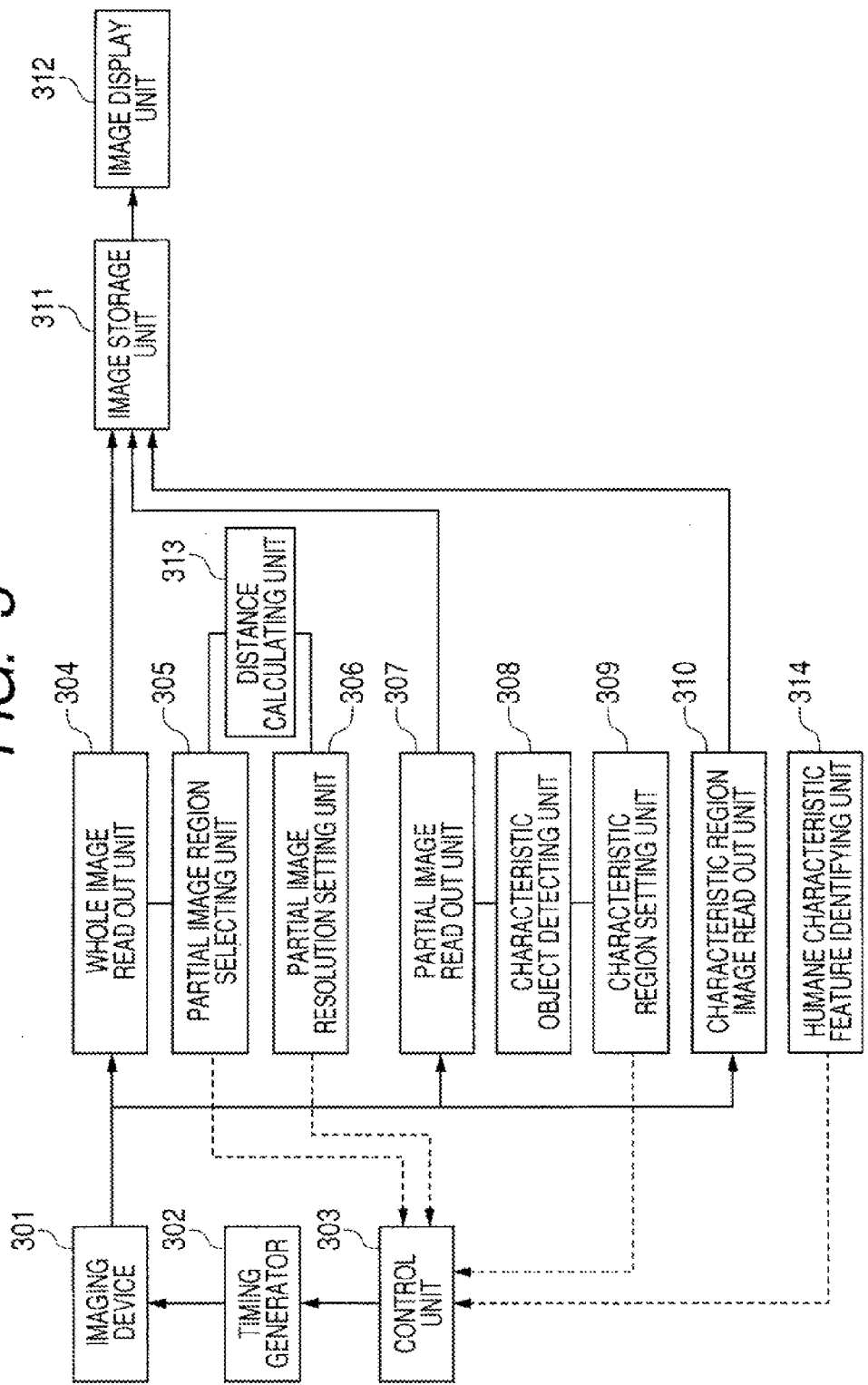
FIG. 3 is a block diagram illustrating one example of a hardware configuration of an imaging system according to a second embodiment of the present invention.

FIG. 3 is a block diagram illustrating one example of a hardware configuration of an imaging system according to a second embodiment of the present invention. The case of the monitoring system will be described as an example. An imaging device 301 images a monitoring region and is similar to that of embodiment 1. A timing generator 302 generates timing signals required for drive and signal processing of the imaging device 301. A control unit 303 controls the operation of the timing generator 302. A whole image read out unit 304 images a whole monitoring region. A partial image region selecting unit 305 selects a partial image region in an optional size. A distance calculating unit 313 calculates a distance to an imaging point from the monitoring system from the region information selected in the partial image region selecting unit 305. A partial image resolution setting unit 306 sets a partial image resolution from the distance to the imaging point calculated in the distance calculating unit 313. A partial image read out unit 307 reads out the partial image region which is selected in the partial image region selecting unit 305 in the resolution set in the partial image resolution setting unit 306. A characteristic object detecting unit 308 is for analyzing a partial image, and detecting whether or not an intruder such as a human figure is present within the partial image region. A characteristic region setting unit 309 sets a region as a characteristic region when the presence of an intruder is detected in the region in the characteristic object detecting unit 308. A characteristic region image read out unit 310 reads out the region set in the characteristic region setting unit 309 in a high resolution. An image storage unit 311 is for storing the respective images which are read out. An image display unit 312 is for displaying the stored image data on a display. A human characteristic feature identifying unit 314 identifies a human characteristic feature. By using the monitoring system configured as above, the details of its operation will be described below.

Figure 4:
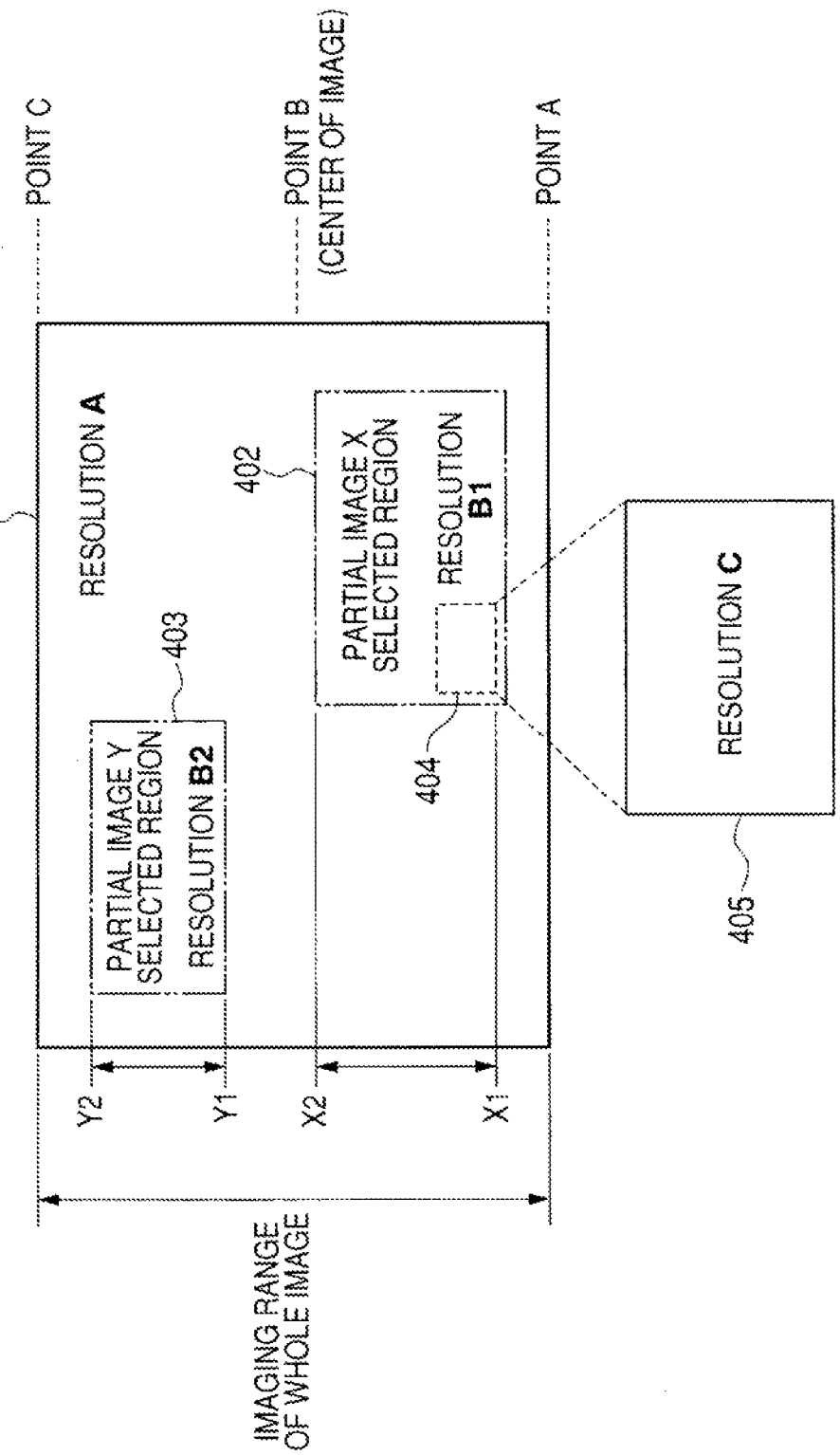
FIG. 4 is a diagram illustrating one example of a monitoring method of the imaging system according to the second embodiment of the present invention.

FIG. 4 is a diagram illustrating one example of a monitoring method of the monitoring system according to the present embodiment. The imaging device 301 outputs a whole image 401 of an imaging region by a drive signal from the timing generator 302. The whole image read out unit 304 reads out the whole image 401 in a resolution A from the imaging device 301, and stores the whole image 401 in the image storage unit 311. The image display unit 312 displays the whole image 401 in the image storage unit 311. At this time, the monitoring system only has to display the whole imaging region. Therefore, it is more suitable from the viewpoint of the load of data processing that the whole image read out unit 304 reads out the whole image 401 in a low resolution (resolution A) by thinning out the pixels. Further, the whole image 401 does not always have to be monitored, and therefore, the frame rate of the whole image 401 may be low.

The partial image region selecting unit 305 selects the regions requiring monitoring within the region of the whole image 401, as a partial image (X) 402 and a partial image (Y) 403. The distance calculating unit 313 calculates a distance from the monitoring system to the imaging point from the coordinate positions in the images of the regions of the partial images 402 and 403 selected in the partial image region selecting unit 305.

Figure 5:
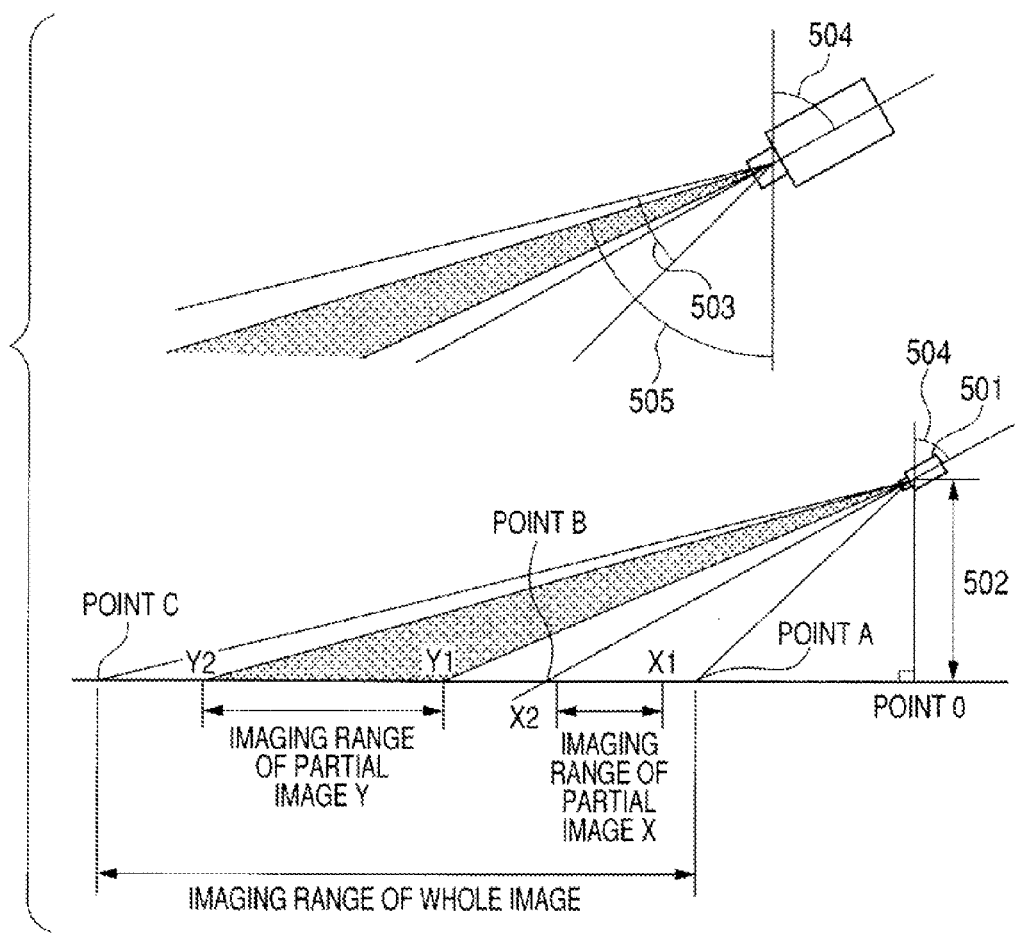
FIG. 5 is a diagram illustrating one example of a distance calculating system according to the second embodiment of the present invention.

Here, one example of a method for calculating a distance will be described by using FIG. 5. The monitoring system 501 is placed at an angle 504 at a height 502. An angle of view of the lens used in the monitoring system 501 is expressed by 503.

When the partial image 402 and the partial image 403 are selected as partial image regions from the whole image 401, the coordinate range in the vertical direction of the partial image 402 is set to be from X1 to X2, and the coordinate range in the vertical direction of the partial image 403 is set to be from Y1 to Y2. For example, when the distance from the monitoring system 501 to the point Y2 of the partial image 403 is calculated, which position in the range of the angle of view 503 the straight line connecting the monitoring system 501 and the point Y2 is located in is known from the coordinates in the vertical direction of the point Y2 on the image. At this time, since the installation angle 504 of the monitoring system 501, the installation height 502 and the angle of view 503 are defined, an angle 505 made by the straight lines connecting the point Y2, the monitoring system 501 and a point 0 is known, and the distance from the monitoring system 501 to the point Y2 can be calculated.

The partial image resolution setting unit 306 sets the resolutions of the partial images 402 and 403 based on the distance information thus calculated. At this time, as the distance information used for setting the resolutions of the partial images 402 and 403, it is suitable to set the resolutions based on the distance information of the farthest point in the region of the selected partial images 402 and 403 from the viewpoint of securing detection ability. Thus, the partial image (X) 402 which is the region at a comparative short distance can be set in a low resolution (resolution B1), and the partial image (Y) 403 which is at a relatively long distance is set in a high resolution (resolution B2). Thereby, the optimal resolution can be set in accordance with the partial image selecting region (in this case, the resolution B1 is set to be smaller than the resolution B2). Further, when the selecting region of the partial image 402 or 403 is set in a wide range, one partial image 402 or 403 may be classified and divided into a plurality of partial images based on the distance information, and the resolutions of the divided partial images may be respectively set. The control unit 303 receives the regions of the partial images 402 and 403 selected in the partial image region selecting unit 305, and receives the partial image resolution set information set in the partial image resolution setting unit 306. Subsequently, the control unit 303 controls the timing generator 302 in accordance with the received information. The timing generator 302 follows the control of the control unit 303, and outputs a timing signal to the imaging device 301. The imaging device 301 outputs the partial image 402 in the resolution B1, and outputs the partial image 403 in the resolution B2. The partial image read out unit 307 reads out the partial image 402 in the resolution B1 and the partial image 403 in the resolution B2 from the imaging device 301, and stores them in the image storage unit 311. The image display unit 312 displays the partial images 402 and 403 in the image storage unit 311.

When a human figure is photographed in the region of the partial image 402 or the partial image 403 in the partial image thus read out, the characteristic object detecting unit 308 detects the human figure within the region of the partial image 402 or 403. The characteristic object detecting unit 308 performs subtracting process of the partial image with only the background which is acquired in advance and the partial image which is continuously acquired. When the pixel region with the change amount of the pixel signal level of the partial image exceeding a fixed level is present from the difference of the two partial images, the characteristic object detecting unit 308 determines that an intruder occurs in the region, and detects the human figure. When the human figure is detected by the characteristic object detecting unit 308, the characteristic region setting unit 309 sets the detected region as a characteristic region 404. When the control unit 303 receives the characteristic region 404 which is set by the characteristic region setting unit 309, the control unit 303 controls the timing generator 302 so as to read out the characteristic region 404 in the resolution C. The timing generator 302 follows the control of the control unit 303, and outputs a timing signal to the imaging device 301. The imaging device 301 outputs a characteristic image 405 of the characteristic region 404 in the resolution C. The characteristic region image read out unit 310 reads out the characteristic image 405 in the resolution C from the imaging device 301, and stores the characteristic image 405 in the storage unit 311. The image display unit 312 displays the characteristic image 405 in the storage unit 311. As above, the characteristic region image read out unit 310 reads out the characteristic image 405 in a high resolution (resolution C) in order to specify and identify the intruding human figure.

The humane characteristic feature identifying unit 314 identifies the human characteristic feature by using the characteristic image 405 which is read out in the resolution C. When the humane characteristic feature identifying unit 314 cannot achieve identification of the human characteristic feature, the humane characteristic feature identifying unit 314 can instruct the control unit 303 to read out the characteristic image 405 in a higher resolution (resolution D). Then, the control unit 303 controls the imaging device 301 to read out the characteristic image 405 in the resolution D via the timing generator 302. The characteristic region image read out unit 310 reads out the characteristic image 405 in the resolution D from the imaging device 301, and stores the characteristic image 405 in the image storage unit 311. The image display unit displays the characteristic image 405 in the high resolution D in the image storage unit 311.

The present embodiment is characterized by performing readout in the respective regions so that the resolution A is smaller than the resolution B1, or the resolution B2 is smaller than the resolution C. As the resolution of the partial image, the optimal resolution can be automatically set in accordance with the position of the partial image selecting region which is selected. Further, if the human characteristic feature is insufficiently identified in the characteristic image which is read out in the resolution C, the characteristic image can be read out in the resolution D (the resolution C is smaller than the resolution D). As above, only a necessary region is read out in a higher resolution when necessary, and therefore, the readout data amount can be reduced. Therefore, the human face information can be specified without increasing the system load.

The above described monitoring system has a unit for reading out a whole image in a low resolution to identify the monitoring region, a unit for reading out a partial image region in an intermediate resolution to select the characteristic region in which a human figure or the like is present, and a unit for reading out the characteristic region in a high resolution to discriminate a human figure.

Further, the above described monitoring method identifies a monitoring region by the whole image read out in a low resolution, and selects a characteristic object such as a human figure by the partial image read out in the intermediate resolution. Further, a human figure is discriminated and specified by the characteristic image read out in a high resolution.

As above, in the first and second monitoring systems, the whole image read out units 104 and 304 read out the whole images 201 and 401 in the first resolution A from the imaging devices 101 and 301. The partial image region selecting units 105 and 305 select the regions of the partial images 202, 402 and 403 in parts of the whole images 201 and 401 which are read out. The partial image read out units 107 and 307 read out the partial images 202, 402 and 403 of the selected regions in the second resolution B from the imaging devices 101 and 301. The characteristic region setting units 109 and 309 set the characteristic regions 203 and 404 of the characteristic objects present in the partial images 202 and 402 which are read out. The characteristic region image read out units 110 and 310 read out the images 204 and 405 in the set characteristic regions 203 and 404 in the third resolution C from the imaging devices 101 and 301. The resolution setting units 106 and 306 set the resolutions so that the first resolution A is smaller than the second resolution B, and that the second resolution B is smaller than the third resolution C.

The characteristic object detecting units 108 and 308 detect the characteristic objects in the partial images 202, 402 and 403 which are read out. The characteristic region setting units 109 and 309 set the regions of the detected characteristic objects as the characteristic regions 203 and 404.

The partial image region selecting units 105 and 305 select the regions of a plurality of partial images 402 and 403. The resolution setting unit 306 sets the individual second resolutions B1 and B2 to the regions of a plurality of partial images 402 and 403.

The distance calculating unit 313 calculates the distances from the imaging device 301 to the imaging points of the partial images 402 and 403. The resolution setting unit 306 sets the second resolutions B1 and B2 based on the distance calculated by the distance calculating unit 313.

The frame rates of the whole images 201 and 401 are lower than the frame rates of the partial images 202, 402 and 403.

The characteristic feature identifying unit 314 identifies the characteristic feature of the characteristic object from the image 405 of the characteristic region 404 which is read out, and instructs the control unit 303 to read out again the image of the characteristic region 404 in the fourth resolution D which is higher than the third resolution C based on the result of identification.

According to the first and second embodiments, enhancement in ability of detection of the monitoring object such as a human figure in wide-range monitoring and suppression of increase in the system load caused by processing of the picked-up image can be made compatible.

The above described embodiments only show the examples of embodiment in carrying out the present invention, and the technical range of the present invention should not be interpreted as restrictive by them. More specifically, the present invention can be carried out in the various forms without departing from the technical idea and the main feature of the present invention. For example, in the embodiments, the monitoring system and the monitoring method are described as examples, but the present invention is not limited to them. It goes without saying that enhancement in the speed of imaging can be achieved if the imaging system and the imaging method of the present invention are carried out in an ordinary digital camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-299785, filed Nov. 25, 2008, which is hereby incorporated by reference herein in its entirety.

What is claimed is:

1. An imaging system comprising:
   a read out unit:
   for reading out a first image in a first resolution from an imaging device from a first region;
   for reading out, at a different timing from the reading out of the first image, a second image in a second resolution from the imaging device from a second region within the first region; and
   for reading out a third image in a third resolution from a third region within the second region, in response to a detection of a characteristic object in the second image, wherein the first to third resolutions are set such that the first resolution is smaller than the second resolution, and that the second resolution is smaller than the third resolution, wherein the imaging system further comprises
a distance calculating unit for calculating a distance from the imaging device to an imaging point of the second image, and wherein
the second resolution is set based on the distance calculated by the distance calculating unit.

2. The imaging system according to claim 1, further comprising
a characteristic object detecting unit for detecting the characteristic object within the second image read out by the read out unit.

3. The imaging system according to claim 1, wherein
mutually different second resolutions are set for each of plural regions of second regions.

4. The imaging system according to claim 1, wherein
the first image has a frame rate of a value smaller than that of the second image.

5. An imaging system comprising:
a read out unit:
for reading out a first image in a first resolution from an imaging device from a first region;
for reading out, at a different timing from the reading out of the first image, a second image in a second resolution from the imaging device from a second region within the first region; and
for reading out a third image in a third resolution from a third region within the second region, in response to a detection of a characteristic object in the second image,
wherein the first to third resolutions are set such that the first resolution is smaller than the second resolution, and that the second resolution is smaller than the third resolution, and wherein the imaging system further comprises
a characteristic feature identifying unit for identifying a characteristic feature of the characteristic object based on the third image of the third region read out by the read out unit, and for instructing a further reading out of the third image of the third region in a fourth resolution higher than the third resolution according to a result of the identifying.

6. A driving method of an imaging device comprising:
reading out a first image in a first resolution from the imaging device from a first region;
reading out, at a different timing from the reading out of the first image, a second image in a second resolution from a second region within the first region; and
reading out a third image in a third resolution from a third region within the second region, in response to a detection of a characteristic object in the second image, wherein
the first to third resolutions are set such that the first resolution is smaller than the second resolution, and that the second resolution is smaller than the third resolution, wherein
the driving method further comprises
a distance calculating step for calculating a distance from the imaging device to an imaging point of the second image, wherein
plural regions of the second images are set, and
wherein the plural regions of the second images are read out in mutually different second resolutions each for each of the plural regions of second regions, based on the distance calculated by the distance calculating unit.

7. The driving method according to claim 6, wherein
the first image has a frame rate of a value smaller than that of the second image.

8. A driving method of an imaging device comprising:
reading out a first image in a first resolution from the imaging device from a first region;
reading out, at a different timing from the reading out of the first image, a second image in a second resolution from a second region within the first region; and
reading out a third image in a third resolution from a third region within the second region, in response to a detection of a characteristic object in the second image, wherein
the first to third resolutions are set such that the first resolution is smaller than the second resolution, and that the second resolution is smaller than the third resolution, wherein the driving method further comprises
identifying a characteristic feature of the characteristic object based on the third image read out in the reading out from the third region, and instructing a further reading out of the third image of the third region in a fourth resolution higher than the third resolution according to a result of the identifying.

* * * * *